US011135942B2

United States Patent
Tomita et al.

(10) Patent No.: US 11,135,942 B2
(45) Date of Patent: Oct. 5, 2021

(54) RAILWAY DIRECT-CURRENT FEEDING SYSTEM

(71) Applicant: Railway Technical Research Institute, Tokyo (JP)

(72) Inventors: Masaru Tomita, Tokyo (JP); Yusuke Fukumoto, Tokyo (JP)

(73) Assignee: Railway Technical Research Institute, Tokyo (JP)

( * ) Notice: Subject to any disclaimer, the term of this patent is extended or adjusted under 35 U.S.C. 154(b) by 126 days.

(21) Appl. No.: 16/466,186

(22) PCT Filed: Dec. 15, 2017

(86) PCT No.: PCT/JP2017/045193
§ 371 (c)(1),
(2) Date: Jun. 3, 2019

(87) PCT Pub. No.: WO2018/110706
PCT Pub. Date: Jun. 21, 2018

(65) Prior Publication Data
US 2020/0070686 A1 Mar. 5, 2020

(30) Foreign Application Priority Data

Dec. 16, 2016 (JP) .............................. JP2016-244846

(51) Int. Cl.
*B60M 1/12* (2006.01)
*B60M 3/00* (2006.01)
*H01B 12/16* (2006.01)

(52) U.S. Cl.
CPC ................ *B60M 1/12* (2013.01); *B60M 3/00* (2013.01); *H01B 12/16* (2013.01)

(58) Field of Classification Search
CPC . B60M 1/12; B60M 3/00; B60M 3/02; B60M 3/04; B60M 1/00; B60M 1/13; H01B 12/16
See application file for complete search history.

(56) References Cited

U.S. PATENT DOCUMENTS

| 4,468,572 A | * | 8/1984 | Miura | ........................ | H02J 7/34 307/69 |
| 2014/0378312 A1 | * | 12/2014 | Tamada | ................. | H01B 12/16 505/163 |

FOREIGN PATENT DOCUMENTS

| EP | 2793240 A1 | 10/2014 |
| JP | 2000-118270 A | 4/2000 |
| JP | 2000118270 A | * 4/2000 |

(Continued)

OTHER PUBLICATIONS

Extended European Search Report for corresponding EP Application No. 17880988.5, dated Jun. 30, 2020—7 pages.

(Continued)

*Primary Examiner* — Mark T Le
(74) *Attorney, Agent, or Firm* — Dority & Manning, P.A.

(57) ABSTRACT

A railway direct-current system according to the present invention is provided with: a feeding line that is connected to a plurality of electric power substations arranged along a railway; and a trolley line that is connected to the feeding line via feeding branch lines at an arbitrarily defined interval, wherein a superconductive feeding cable is connected to somewhere midway in each of railroad lines extending from the substations to the trolley line via the feeding lines, so as to be parallel with the railroad line.

5 Claims, 6 Drawing Sheets

(56) References Cited

FOREIGN PATENT DOCUMENTS

| JP | 2008174107 A | * | 7/2008 |
|---|---|---|---|
| JP | 2008-213656 A | | 9/2008 |
| JP | 2011-055685 A | | 3/2011 |
| JP | A-2011-051558 | | 3/2011 |
| JP | 2013-125647 A | | 6/2013 |
| JP | 5438630 B2 | * | 3/2014 |

OTHER PUBLICATIONS

International Search Report for PCT/JP2017/045193 dated Mar. 20, 2018, 2 pages.

* cited by examiner

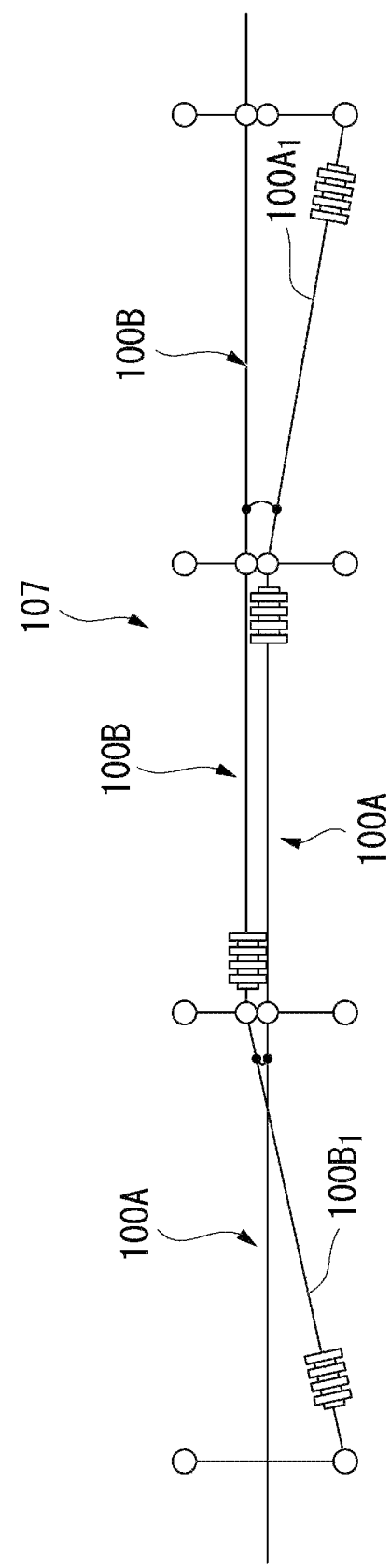

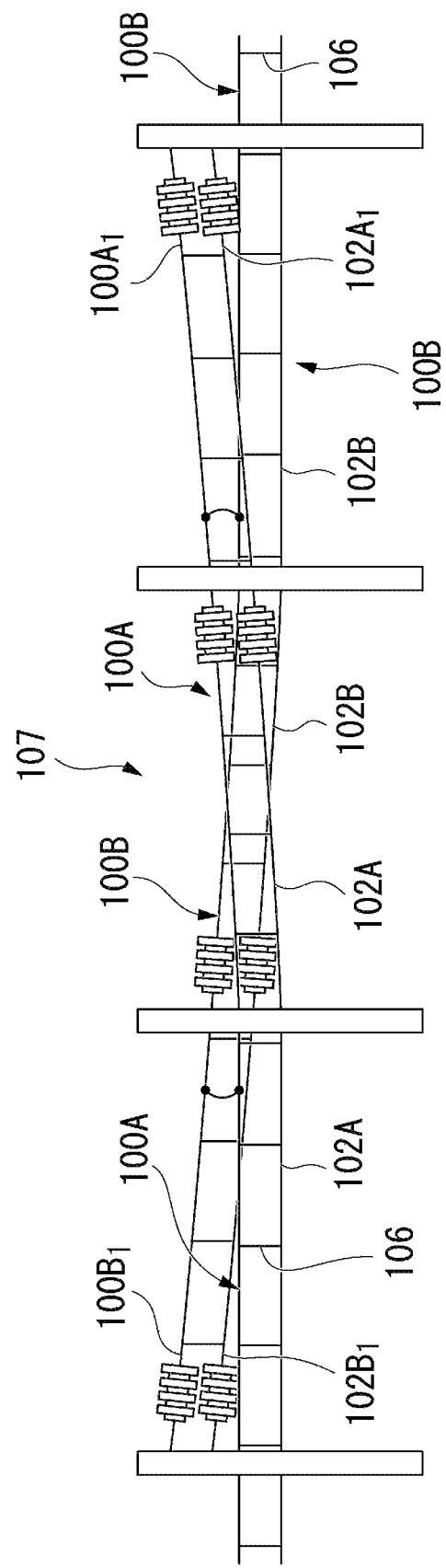

RAILWAY DIRECT-CURRENT FEEDING SYSTEM

TECHNICAL FIELD

The present invention relates to a direct-current feeding system for running a direct-current electric railway vehicle.

Priority is claimed on Japanese Patent Application No. 2016-244846 filed Dec. 16, 2016, the content of which is incorporated herein by reference.

BACKGROUND ART

FIG. 5 is a schematic view of a conventional railway feeding system, and FIGS. 6A and 6B are enlarged schematic views of an air section portion provided in the railway feeding system.

In FIG. 5, SS1, SS2, and SS3 indicate substations, 100 indicates a feeding line, 102 indicates a trolley line, 103 indicates a rail, and 105 indicates a railway vehicle in operation. Feeding branch lines 106 are connected to the feeding line 100 at predetermined intervals in a length direction of the feeding line 100, and each feeding branch line 106 is connected to the trolley line 102. Joint portions of the line called air sections are provided in the trolley line 102 at appropriate intervals in a length direction of the trolley line 102, and divide the trolley line into each line in the configuration of FIGS. 6A and 6B.

For example, in the case of an air section 107 which divides a feeding section into a line 111 and a line 112, a terminating end portion $100A_1$ of the feeding line 100A and a terminating end portion $102A_1$ of the trolley line 102A, which are on the line 111 side, extend slightly obliquely upward past the air section 107, as shown in FIG. 6B. Similarly, a starting end portion $100B_1$ of the feeding line 100B and a starting end portion $102B_1$ of the trolley line 102B, which are on the line 112 side, extend obliquely upward before the air section 107. As a result, the terminating end portion $100A_1$ of the feeding line 100A and the starting end portion $100B_1$ of the feeding line 100B are disposed in opposite directions to cross each other in an X shape in a side view, as shown in FIG. 6B. Also, in the schematic views shown in FIGS. 5, 6A and 6B, the feeding line side is a positive electrode, and the rail 103 is connected to the substations SS via return lines 109 as a negative electrode side.

When the railway vehicle 105 passes through the air section 107 portion, a pantograph of the railway vehicle 105 is switched from a state of feeding from the trolley line 102A while being in contact therewith to a state of feeding from the trolley line 102B, and is switched from feeding from the line 111 to feeding from the line 112.

In the railway system, electricity is fed from the substations SS to the railway vehicle 105 through the feeding line 100 and the trolley line 102. After the electricity is used to drive the railway vehicle 105 and operate auxiliary devices, the electricity returns to the substations SS through the rail 103 and the return lines 109 and the like.

In the conventional railway feeding system mentioned above, since the trolley line 102 is formed of a thin wire, there is a problem that electrical resistance is great, and therefore a certain voltage drop cannot be avoided in the trolley line 102 provided in a feeding section.

In addition, a structure for lowering electrical resistance by using a thick wire to reduce a voltage drop in the feeding line 100 is employed. However, since a resistance value is present no matter how thick a wire is used, a voltage drop occurs to some extent when a long feeding line 100 is used.

Various proposals have been made to solve this problem, and as an example, a proposal to improve power transmission efficiency by making a feeding line from a superconductive feeding cable to eliminate electrical resistance has been presented (see Patent Document 1).

CITATION LIST

Patent Document

[Patent Document 1] Japanese Unexamined Patent Application, First Publication No. 2013-125647

SUMMARY OF INVENTION

Technical Problem

Meanwhile, in a railway feeding system, it is desirable for substations are able to be installed at sufficiently short intervals. However, it may not be possible to secure spaces for installing substations since there are also problems with securing land in urban areas and the like. At present, substations are installed at intervals of about 5 km or less in urban areas and the like, but in some locations, substations may be installed at intervals of more than 5 km. In addition, it is desirable to provide an air section portion for dividing lines of the same substation in the vicinity of the substation. However, it may be installed at a position far from the substation if a distance from the substation is long due to location restrictions, or if the lines between the substations are divided or the like.

In these cases, the distances from the substation to the trolley lines on both sides of the air section portion are different from each other depending on the location. When these distances are largely different from each other, a potential difference between the trolley lines on both sides of the air section portion may become larger. Here, if a large potential difference occurs during the pantograph passage before and after the air section portion, there is a problem that a strong spark is generated between the pantograph and the trolley line.

According to the study of the present inventors, for example, in the case of a railway vehicle traveling on a power supply of 1500 V in an urban area, it has been found that if the potential difference before and after the air section is within 10 V, a spark does not occur or does not become a large spark even if a spartk occurs. As an example, in the case of feeding 1500 V, assuming that the potential of the pantograph shorting both of the trolley lines when passing through the air section is 1450 V, a potential difference of as much as 50 V is generated since the potential of the trolley lines separated from each other after passing is 1500 V, and thus a strong spark may be generated.

The present invention has been made in view of the above circumstances, and an object of the present invention is to provide a technique in which, in the case where an air section is provided at a distance from a substation, a potential difference can be reduced in trolley lines before and after the air section, so that a large spark is not emitted even when a railway vehicle travels through the air section.

Solution to Problem

A railway direct-current feeding system according to the present invention is a railway direct-current feeding system including a feeding line connected to a plurality of substations disposed along a railway, and a trolley line connected to the feeding line via feeding branch lines at arbitrary intervals, in which a superconductive feeding cable is connected to a midway portion of a line connecting each substation to the trolley line via the feeding line in parallel to the line.

In the line of the portion where the superconductive feeding cables are connected in parallel, by flowing current through the superconductive feeding cable with zero electrical resistance, almost no voltage drop occurs in the line section in which the superconductive feeding cable is connected in parallel, or the voltage drop is greatly reduced. For this reason, in the line from the substation including the line to which the superconductive feeding cable is connected in parallel to the air section, the voltage drop can be significantly inhibited as compared with the conventional case. Therefore, in the trolley line fed from different lines before and after the air section, the potential difference between the two lines can be reliably reduced as compared to the conventional case, and generation of a spark when the railway vehicle passes through the air section can be eliminated or inhibited.

In the present invention, the superconductive feeding cable may have a function of inhibiting a voltage drop of the line connected in parallel.

When the superconductive feeding cable is connected in parallel to the line from the substation to the trolley line, no voltage drop occurs before and after the portion connected in parallel, and thus the superconductive feeding cable exhibits a function of inhibiting a voltage drop.

In the present invention, the superconductive feeding cable can be connected in parallel to at least a portion of the feeding line.

At least a portion of the feeding line can be selected as the portion of the superconductive feeding cable connected in parallel. In this case, the voltage drop can be inhibited before and after the feeding line connected in parallel.

In the present invention, the feeding line includes a first extension feeding line which branches from a portion of the feeding line connected to the substations and is connected to the trolley line, and a second extension feeding line which branches from another portion of the feeding line and is connected to the trolley line, and the superconductive feeding cable can be connected in parallel to the second extension feeding line.

When the superconductive feeding cable is connected in parallel to the second extension feeding line, a configuration in which no voltage drop occurs before and after the portion of the second extension feeding line connected in parallel can be obtained. Since there is no voltage drop on the starting and terminating end sides of the second extension feeding line, it is possible to provide a railway feeding system capable of reducing the potential difference between the trolley lines on both sides of the air section even when the distance to the trolley line of the air section portion is long.

In the present invention, a configuration in which a high-speed circuit breaker is incorporated on a front side of the portion of the second extension feeding line connected in parallel to the superconductive feeding cable can be employed.

In the present invention, a configuration in which an auxiliary feeding line extending along the trolley line is connected to a midway portion of the first extension feeding line, and a plurality of feeding branch lines for connecting to the trolley line are connected to the auxiliary feeding line at arbitrary intervals can be employed.

In the present invention, a configuration in which a high-speed circuit breaker is incorporated on a side closer to the substation than to the portion connected to the auxiliary feeding line in the first extension feeding line can be employed.

If the high-speed circuit breaker is incorporated in the first extension feeding line or the second extension feeding line, it is possible to interrupt the circuit when an abnormal current flows in these lines and to prevent the lines from being damaged.

Effects of Invention

According to the present invention, in the line of the portion where the superconductive feeding cables are connected in parallel, by flowing current through the superconductive feeding cable with zero electrical resistance, almost no voltage drop occurs in the section in which the superconductive feeding cable is connected in parallel, or the voltage drop is greatly reduced. For this reason, in the line from the substation including the line to which the superconductive feeding cable is connected in parallel to the air section, the voltage drop can be significantly inhibited as compared with the conventional case. Therefore, in the trolley line fed from different substations before and after the air section, the potential difference between the two trolley lines on both sides of the air section can be reliably reduced as compared to the conventional case, and generation of a spark when the railway vehicle passes through the air section can be inhibited.

BRIEF DESCRIPTION OF DRAWINGS

FIG. 6A is an enlarged schematic plan view of an air section portion provided in the railway feeding system.

FIG. 6B is an enlarged schematic side view of the air section portion.

DESCRIPTION OF EMBODIMENTS

Hereinafter, a first embodiment of a railway direct-current feeding system according to the present invention will be described with reference to the drawings.

Figure 1:
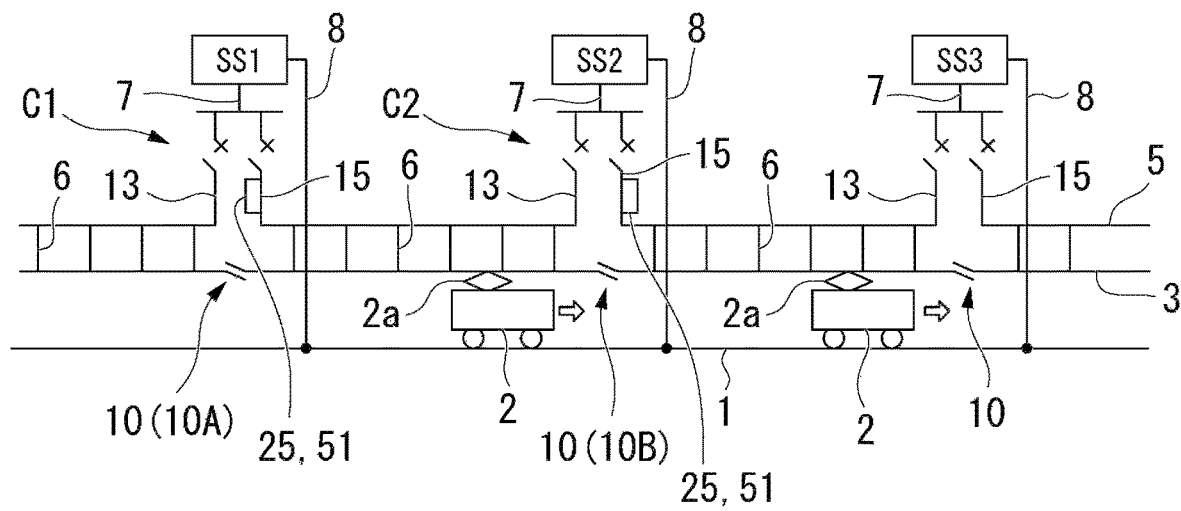
FIG. 1 is a schematic view of an overall railway direct-current feeding system according to a first embodiment of the present invention.

FIG. 1 shows an outline of an overall railway direct-current feeding system according to the first embodiment. A railroad line is configured by laying a rail 1, and a railway vehicle 2 is configured to be able to travel on the rail 1. A plurality of substations SS are provided at arbitrary intervals along the railroad line. A distance between adjacent substations SS may be about 5 km in urban areas or the like and about 10 km in suburban areas, but also about 5 to 10 km in some locations in urban areas and about 10 to 20 km in some locations in suburban areas.

Since three substations SS are shown in the embodiment of FIG. 1, for ease of explanation, the substations are referred to as a substation SS1, a substation SS2, and a substation SS3 in that order from the left side of FIG. 1 in the following description.

A trolley line 3 is constructed above the rail 1, a pantograph 2a of the railway vehicle 2 traveling on the rail is in contact with the trolley line 3 to be fed with power, and the railway vehicle 2 is configured to be able to travel by driving a motor provided in the railway vehicle 2.

A feeding line 5 is constructed above the trolley line 3, and power can be fed from the feeding line 5 to the trolley line 3 via a plurality of feeding branch lines 6 which are connected to the feeding line 5 at predetermined intervals in a length direction thereof to be separately connected to the trolley line 3.

A connecting line 7 is connected from the substation SS1 to the feeding line 5 near the substation SS1, a connecting line 7 is connected from the substation SS2 to the feeding line 5 near the substation SS2, and a connecting line 7 is connected from the substation SS3 to the feeding line 5 near the substation SS3, whereby electricity can flow from each substation to the feeding line 5. Further, a return line 8 connecting the substation SS1 and the rail 1 is provided in the vicinity of the connecting line 7, the connecting line 7 is connected to the substation SS1 as a positive electrode side, and the return line 8 is connected to the substation SS1 as a negative electrode side. Similarly, a return line 8 is connected to the substation SS2.

In addition, the substations SS are sequentially provided along the railroad line. Since only three substations are illustrated in FIG. 1, only three connecting lines 7 and three return lines 8 are described. However, the connecting lines 7 and the return lines 8 are provided for each of the substations to be installed.

An air section 10 is incorporated in a portion of the trolley line 3 positioned at a boundary between a feeding section supplied with electricity from a line C1 of the substation and a feeding section supplied with electricity from a line C2 of the substation. A structure of the air section 10 is the same as the conventional structure described above with reference to FIGS. 6A and 6B. When the pantograph 2a of the railway vehicle 2 passes through the air section 10, power supply from the line C1 and power supply from the line C2 are switched.

In addition, the substations SS are sequentially provided along the railroad line. Since only three substations are illustrated in FIG. 1, only three connecting lines 7 and three return lines 8 are described. However, the connecting lines 7 and the return lines 8 are provided for each of the substations to be installed.

An air section 10 is incorporated in a portion of the trolley line 3 positioned at a boundary between a feeding section supplied with electricity from a line C1 of the substation and a feeding section supplied with electricity from a line C2 of the substation. A structure of the air section 10 is the same as the conventional structure described above with reference to FIG. 7. When the pantograph 2a of the railway vehicle 2 passes through the air section 10, power supply from the line C1 and power supply from the line C2 are switched.

As shown in FIG. 1, a superconductive feeding cable 25 is connected in parallel to a middle of a line from the substation SS1 via the connecting line 7, the feeding line 5 and the feeding branch line 6 to the trolley line 3.

A connection circuit shown in FIG. 1 is a schematic diagram. It will be assumed in the following description that the railway vehicles 2 travel in directions of the arrows in FIG. 1.

In the trolley line 3 shown in FIG. 1, a first air section 10A and a second air section 10B are provided at predetermined intervals in a traveling direction of the railway vehicle 2, and three feeding sections are partially shown in FIG. 1. The line circuit shown in FIG. 1 is a line circuit connected to each of a plurality of substations SS1, SS2, and the like, which are disposed in the traveling direction of the railway vehicle 2. Also, the air section 10A and the air section 10B are disposed at predetermined intervals in a length direction of the trolley line 3. Accordingly, when the air section 10A is a reference point, a side closer to the air section 10B is referred to as a rear stage side of the air section 10A, and the opposite side is referred to as a front stage side of the air section 10A.

A first extension feeding line 13 formed by extending a part of the feeding line 5 connected to the substation SS is connected to the trolley line 3 on the front stage side of the first air section 10A, and a second extension feeding line 15 formed by extending a part of the feeding line 5 connected to the substation SS is connected to the trolley line 3 on the rear stage side of the second air section 10B. In the first extension feeding line 13, the vicinity of a portion connected to the trolley line 3 corresponds to the feeding branch line 6.

The superconductive feeding cable 25 is connected in parallel to the second extension feeding line 15. In the second extension feeding line 15, a portion from the portion connected to the superconductive feeding cable 25 on a side close to the trolley line 3 to the trolley line 3 corresponds to the feeding branch line 6.

A cable having a structure in which a high temperature superconductive wire exhibiting a superconductive state at liquid nitrogen temperature is disposed in a refrigerant passage of liquid nitrogen can be applied as the superconductive feeding cable 25 used here.

Figure 3A:
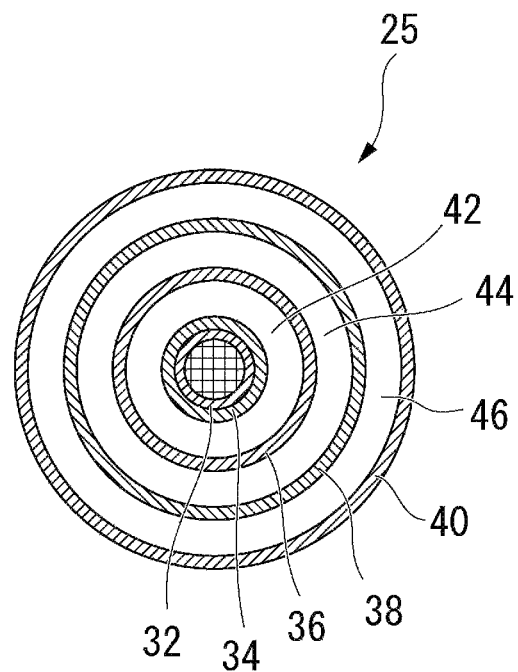
FIG. 3A shows a structural example of a superconductive feeding cable incorporated in the railway direct-current feeding system, and is a cross-sectional view showing a superconductive feeding cable of a first example.

As an example, as shown in FIG. 3A, in the superconductive feeding cable 25, a superconductive layer 32 and a shield superconductive layer 34 to be cooled are inserted into an inner tube 36, the inner tube 36 is inserted into an outer tube 38, and the outer tube 38 is inserted into a vacuum jacket 40. Liquid nitrogen flows as a refrigerant in a space 42 formed between the shield superconductive layer 34 and the inner pipe 36, liquid nitrogen flows as a refrigerant in a space 44 formed between the inner pipe 36 and the outer pipe 38, and a space 46 between the outer tube 38 and the vacuum jacket 40 is kept in a vacuum state to form a heat insulating layer.

Figure 3B:
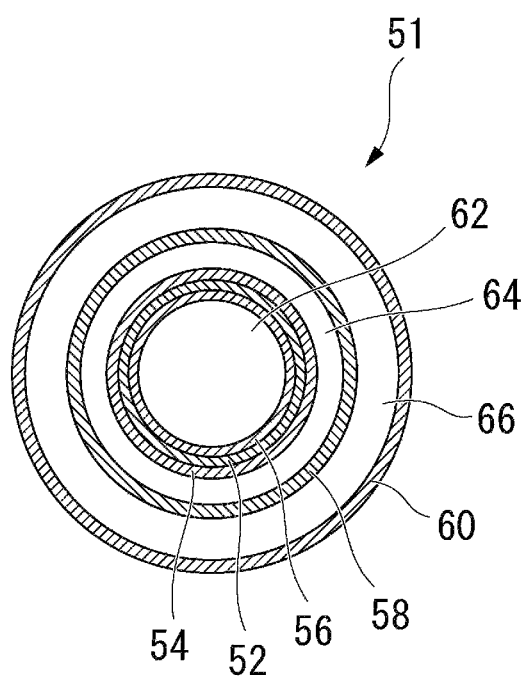
FIG. 3B shows a structural example of a superconductive feeding cable incorporated in the railway direct-current feeding system, and is a cross-sectional view showing a superconductive feeding cable of a second example.

In addition, as another example, a superconductive feeding cable 51 shown in FIG. 3B can be used instead of the superconductive feeding cable 25. In this superconductive feeding cable 51, a superconductive layer 52 and a shield superconductive layer 54 to be cooled are wound around an outer circumference of an inner tube 56, the inner tube 56 is inserted into an outer tube 58, and the outer tube 58 is inserted into a vacuum jacket 60. Liquid nitrogen flows in a space 62 in the inner pipe 56, liquid nitrogen flows in a space 64 formed between the shield superconductive layer 54 and the outer pipe 58, and a space 66 between the outer pipe 58 and the vacuum jacket 60 is kept in a vacuum state.

In the line including the trolley line 3, the feeding line 5, the superconductive feeding cable 25 or the like shown in FIG. 1, as an example, since a length of the first extension feeding line 13 is set to about 650 m and a length of the second extension feeding line 15 is set to about 900 m, the superconductive feeding cable 25 or the superconductive feeding cable 51 can be connected in parallel to the second extension feeding line 15.

Figure 4:
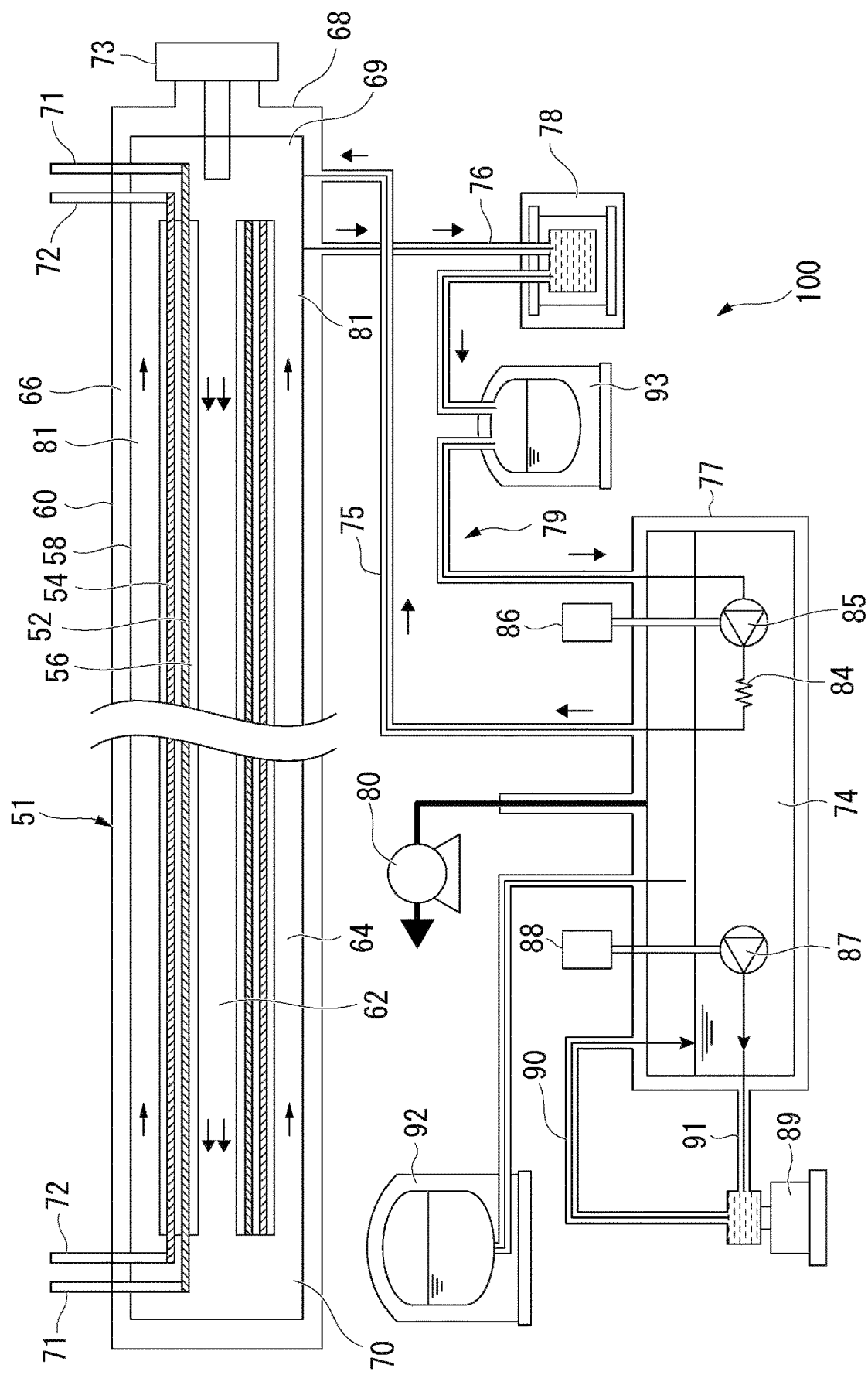
FIG. 4 is a configuration diagram showing an example of a superconductive feeding cable incorporated in the railway direct-current feeding system and an example of a cooling mechanism thereof.
Figure 5:
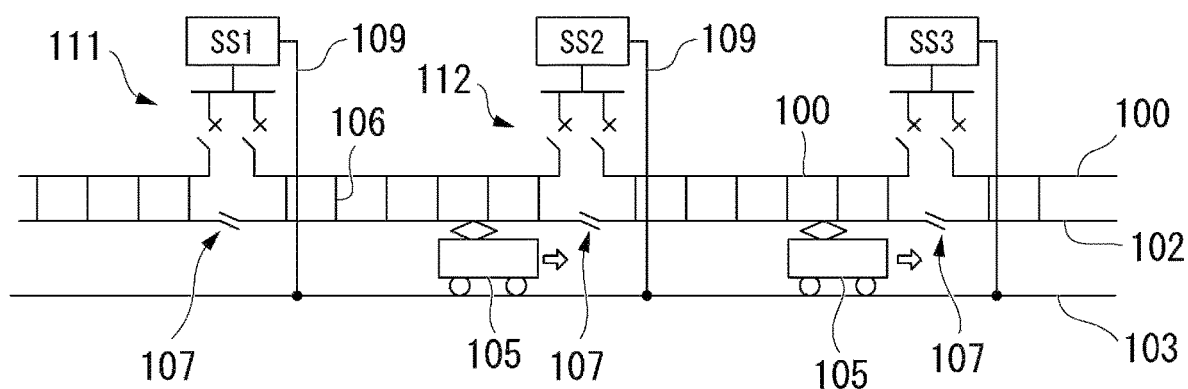
FIG. 5 is a schematic view showing an example of a conventional railway feeding system.

FIG. 4 shows an example of an overall structure of a device including a mechanism for cooling the superconductive feeding cable 51. A refrigerant introduction section 69 is provided on one end side of the outer tube 68 accommodating the superconductive feeding cable 51, a turnback section 70 is provided on the other end side, and a refrigerator 73 is connected to the introduction section 69. A power lead 71 for connecting to the superconductive layer 52 and a power lead 72 for connecting to the shield superconductive layer 54 are provided in the introduction section 69 and the turnback section 70, respectively, and the power leads 71 and 71 are connected to the second extension feeding line 15 as shown in FIG. 1. That is, one power lead 71 is connected to the second extension feeding line 15 on a side close to the substation SS1, and the other power lead 71 is connected to the second extension feeding line 15 on a side close to the trolley line 3.

One end portion of an introduction pipe 75 and one end portion of a discharge pipe 76 are connected to the introduction section 69 in the outer pipe 68, a storage tank 77 is connected to the other end of the introduction pipe 75, a flow meter unit 78 is connected to the other end of the discharge pipe 76, and the storage tank 77 and the flow meter unit 78 are connected via a circulation pipe 79.

The storage tank 77 is a tank for storing liquid nitrogen 74, and the inside of the storage tank 77 can be depressurized by connecting the vacuum pump 80 to a portion of the storage tank 77.

A space section 81 is formed on an outer circumferential side of the superconductive feeding cable 51 inside the outer tube 68, and one end of the discharge pipe 76 faces the space section 81 near the introduction section 69.

The other end of the introduction pipe 75 is connected to a discharge side of a heat exchanger 84 provided at a position immersed in liquid nitrogen in the storage tank 77, and the other end of the discharge pipe 76 is connected to an inlet side of the heat exchanger 84 via a circulation pump 85. Also, the reference numeral 86 denotes a motor for operating the circulation pump 85.

With the above configuration, a refrigerant circulation channel in which refrigerant is circulated via the pump 85→the heat exchanger 84→the introduction pipe 75→the introduction section 69→the space 62 in the superconductive feeding cable 51→the turnback section 70→the space section 81→the discharge pipe 76→the flow meter unit 78→circulation pump 85 in that order is formed.

In FIG. 4, a reference numeral 87 is a supply pump provided in the storage tank 77, a reference numeral 88 is a motor for the pump, a reference numeral 89 is a refrigerator, a reference numeral 90 is a supply pipe, a reference numeral 91 is a discharge pipe, which can cool the liquid nitrogen in the storage tank 77, and a reference numeral 92 denotes a reservoir tank for supplying liquid nitrogen. Also, a reservoir tank 93 is also incorporated in a midway portion of the discharge pipe 76.

Also, since facilities such as the storage tank 77, the flow meter unit 78, the introduction pipe 75, the discharge pipe 76, the circulation pipe 79, the vacuum pump 80, the refrigerator 89, the reservoir tank 92, and the like, are facilities provided for more complete cooling of the superconductive feeding cable 51, the facilities may be omitted depending on a length of the superconductive feeding cable 51 and a cooling scale. For example, when used in an environment where the liquid nitrogen which fills in the spaces 62 and 64 covered by the vacuum jacket 60 in the superconductive feeding cable 51 does not evaporate, a configuration in which a necessary amount of liquid nitrogen is periodically replenished to the superconductive feeding cable 51 from a separate liquid nitrogen cylinder and the like may be adopted instead of the facilities, and the facilities may be simplified. Further, the configuration of the superconductive feeding cable 51 is simply shown in FIG. 4, and the description of the space 66 provided inside the vacuum jacket 60 and a connection structure for making the space 66 vacuum are omitted. In order to make the space 66 a vacuum structure, both end portions of the superconductive feeding cable 51 may be closed to form the space 66 as a closed space, and a portion of the superconductive feeding cable 51 may be provided with a portion connected to a pressure reducing device such as a vacuum pump so that the space 66 can be depressurized.

In the line including the trolley line 3, the feeding line 5, the extension feeding lines 13 and 15, the superconductive feeding cables 25 and 51, and the air sections 10A and 10B as shown in FIG. 1, during the railway vehicle 2 passes through the air section 10A and reaches the air section 10B, the railway vehicle 2 travels by receiving power supply from the trolley line 3 supplied with voltage via the extension feeding line 13.

In the line shown in FIG. 1, after the railway vehicle 2 moves along the trolley line 3 between the air sections 10A and 10B being supplied with electricity from the substations, the railway vehicle 2 moves to the trolley line 3 on the rear stage side past the air section 10B which is being fed via the second extension feeding line 15 which is a long line. Here, when the superconductive feeding cables 25 and 51 are not provided, there is a possibility that a supplied voltage from the substation SS1 drops due to the presence of the long second extension feeding line 15, and a large voltage drop close to 50 V exceeding 10 V occurs in the trolley line 3 before and after the air section 10B.

When the railway vehicle 2 passes through the air section 10B causing such a voltage drop, in the case of 1500 V driving, the front stage side of the air section 10B becomes 1490 V and the rear stage side thereof becomes 1450 V, in which a voltage difference of 40 V occurs. Accordingly, there is possibility that a strong spark occurs at a portion of the pantograph 2a in contact with the trolley line 3.

On the other hand, in the structure in which the superconductive feeding cable 25 or the superconductive feeding cable 51 is connected in parallel to the long second extension feeding line 15 shown in FIG. 1, since the resistance when current flows through the superconductive feeding cables 25 and 51 is 0, there is almost no voltage drop between starting and terminating end sides of the second extension feeding line 15. For this reason, assuming that the voltage drop on the front stage side of the air section 10B is 10 V and the voltage is 1490 V, the voltage drop on the rear stage side of the air section 10B is a voltage drop due to the resistance of the line except for the portion where the superconductive feeding cables 25 and 51 are provided, and thus, for example, when the voltage is lowered by about 5 V to 1495 V, a potential difference of 5 V is obtained. For this reason, when the railway vehicle 2 passes through the air section 10B, sparks hardly occur. Alternatively, even if sparks may occur, it is possible to inhibit sparks to be small sparks that do not affect the surroundings. Therefore, safe traveling when the railway vehicle 2 passes through the air section 10B can be ensured.

In addition, there is a possibility that an unexpected large current flows in the line shown in FIG. 1 due to a short circuit current and the like. Accordingly, in that case, it is desirable that a high-speed circuit breaker be incorporated in an outer connecting portion of the power leads of the superconductive feeding cables 25 and 51 so that the flow of current can be interrupted. In this case, damage to the superconductive feeding cables 25 and 51 can be prevented.

Figure 2:
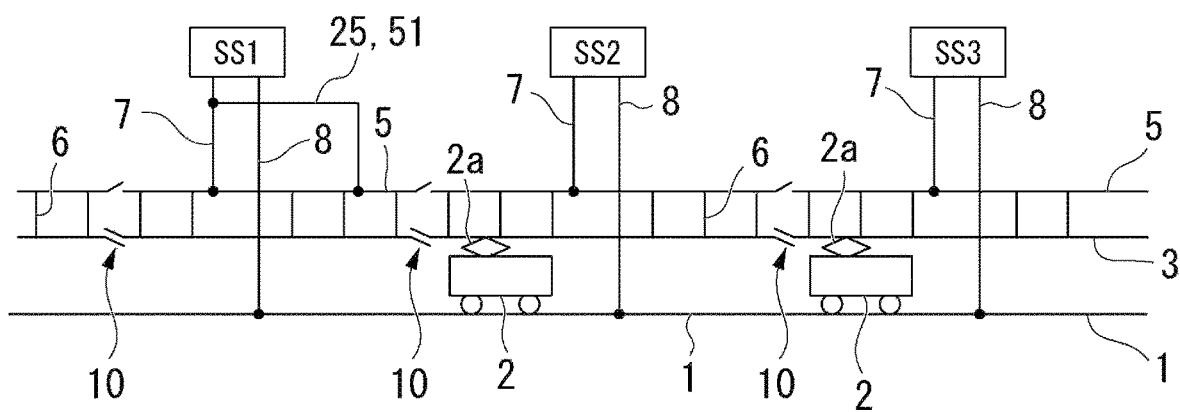
FIG. 2 is a schematic view of an overall railway direct-current feeding system according to a second embodiment of the present invention.

FIG. 2 shows an outline of an overall railway direct-current feeding system according to a second embodiment of the present invention. The railway direct-current feeding system according to the second embodiment shows a configuration in which air sections are provided between the substations with a structure separated for each substation.

As in the configuration of the first embodiment, a rail 1, a railway vehicle 2, a plurality of substations SS1, SS2, and the like, a trolley line 3, a feeding line 5, and feeding branch lines 6 are provided. A connecting line 7 is connected to the feeding line, a connecting line 7 is connected to the feeding line 5 near the 5 near the substation SS1, a connecting line 7 is connected to the feeding line 5 near the substation SS2, and other connecting lines 7 are connected to the feeding line 5 near subsequent substations, respectively. A return line 8 is connected to each substation, and the connecting line 7 is connected to each substation SS as a positive electrode side and the return line 8 is connected to the substation SS as a negative electrode side.

In the railway direct-current feeding system according to the second embodiment, the air sections 10 are provided on the feeding line 5 at an intermediate position between the substations SS adjacently disposed along a railroad line and the trolley line 3 immediately below the feeding line 5.

In addition, the superconductive feeding cable 25 or the superconductive feeding cable 51 is connected in parallel to the connecting line 7 which is connected to the feeding line 5 from a certain substation SS (the substation SS1 in FIG. 2). In the case of this structure, as an example, the superconductive feeding cables 25 and 51 are connected in parallel to a portion of the feeding line 5 near the air section 10 from a position of the connecting line 7 near the substation SS1.

By providing the superconductive feeding cables 25 and 51 at this position, it is possible to inhibit a voltage drop from the substation SS to the feeding line 5 close to the air section 10.

This structure can inhibit a voltage drop of the feeding line 5 to a position close to air section 10, and therefore, when the railway vehicle 2 passes through the air section 10 and moves to another section adjacent thereto, it is possible to inhibit generation of sparks in the air section 10, as in the first embodiment.

Also, in the embodiment shown in FIG. 2, although an example in which the superconductive feeding cables 25 and 51 are provided at only one place has been described, the superconductive feeding cables 25 may be provided on any of the connecting lines 7 corresponding to the air sections 10 where a voltage drop is concerned, and therefore, the installation number thereof is not limited to one and may be provided at multiple places.

INDUSTRIAL APPLICABILITY

An object of the present invention is to provide a technique which can inhibit generation of a spark when a railway vehicle passes through an air section.

REFERENCE SIGNS LIST

SS1, SS2, SS3 Substation
1 Rail
2 Railway vehicle
2a Pantograph
3 Trolley line
5 Feeding line
6 Feeding branch line
7 Connecting line
8 Return line
10, 10A, 10B Air section
13 First extension feeding line
15 Second extension feeding line
25, 51 Superconductive feeding cable
71 Power lead

What is claimed is:

1. A railway direct-current feeding system comprising:
   a feeding line connected to a plurality of substations disposed along a railway via a connecting line; and
   a trolley line connected to the feeding line via feeding branch lines at arbitrary intervals,
   wherein a superconductive feeding cable is connected to a midway portion of an electricity supply line connecting each substation to the trolley line via the feeding line and the connecting line, the superconductive feeding cable being connected in parallel to the electricity supply line, and
   a first end of the superconductive feeding cable is connected to the connecting line and a second end of the superconductive feeding cable is connected to the feeding line.

2. The railway direct-current feeding system according to claim 1, wherein the superconductive feeding cable has a function of inhibiting a voltage drop of the electricity supply line to which the superconductive feeding cable is connected in parallel.

3. A railway direct-current feeding system comprising:
   a feeding line connected to a plurality of substations disposed along a railway; and
   a trolley line connected to the feeding line via feeding branch lines at arbitrary intervals,
   wherein the feeding line includes a first extension feeding line which branches from a portion of the feeding line connected to the substations and is connected to the trolley line, and a second extension feeding line which branches from another portion of the feeding line and is connected to the trolley line, and
   a superconductive feeding cable is connected in parallel to the second extension feeding line.

4. The railway direct-current feeding system according to claim 3, wherein a high-speed circuit breaker is incorporated in a connecting portion of the second extension feeding line connected in parallel to the superconductive feeding cable.

5. The railway direct-current feeding system according to claim 3, wherein the superconductive feeding cable has a function of inhibiting a voltage drop of the second extension feeding line.

* * * * *